US012054058B2

(12) United States Patent
Masuyama et al.

(10) Patent No.: US 12,054,058 B2
(45) Date of Patent: Aug. 6, 2024

(54) VEHICLE CHARGING SYSTEM AND VEHICLE

(71) Applicant: SUBARU CORPORATION, Tokyo (JP)

(72) Inventors: Susumu Masuyama, Tokyo (JP); Yuki Natsume, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 352 days.

(21) Appl. No.: 17/684,599

(22) Filed: Mar. 2, 2022

(65) Prior Publication Data

US 2022/0289048 A1 Sep. 15, 2022

(30) Foreign Application Priority Data

Mar. 15, 2021 (JP) .................................. 2021-041595

(51) Int. Cl.
*B60L 53/124* (2019.01)
*B60L 50/60* (2019.01)
*B60L 53/20* (2019.01)
*B60L 53/62* (2019.01)
*H02J 50/10* (2016.01)
*H02J 50/40* (2016.01)
*H02J 50/60* (2016.01)

(52) U.S. Cl.
CPC ............. *B60L 53/124* (2019.02); *B60L 50/60* (2019.02); *B60L 53/20* (2019.02); *B60L 53/62* (2019.02); *H02J 50/10* (2016.02); *H02J 50/40* (2016.02); *H02J 50/60* (2016.02)

(58) Field of Classification Search
CPC ........ B60L 53/124; B60L 53/20; B60L 53/62; B60L 50/60; H02J 50/10; H02J 50/40; H02J 50/60
See application file for complete search history.

(56) References Cited

U.S. PATENT DOCUMENTS

| 2011/0187317 A1* | 8/2011 | Mitake .................... B60L 5/005 |
| | | 320/108 |
| 2014/0167689 A1* | 6/2014 | Niizuma .................. H02J 50/90 |
| | | 320/108 |
| 2018/0091001 A1* | 3/2018 | Meichle .................. H02J 50/90 |

FOREIGN PATENT DOCUMENTS

JP 2020-188649 A 11/2020

\* cited by examiner

*Primary Examiner* — Edwin A Young
(74) *Attorney, Agent, or Firm* — TROUTMAN PEPPER HAMILTON SANDERS LLP

(57) ABSTRACT

A vehicle charging system includes a sensor, a traveling control processor, a traveling drive unit, a transmitter provided on a vehicle configured to travel on a traveling road, and a power-feeding facility provided on the traveling road. The sensor detects obstacles present around the vehicle. The traveling control processor performs traveling control of the vehicle based on the result of detection by the sensor. The traveling drive unit drives the vehicle to travel and includes: a power receiver receiving electric power from the traveling road; a battery storing the electric power; a motor; and an inverter driving the motor with the electric power. The transmitter sends a power-feeding control signal when the sensor detects an obstacle. The power-feeding facility includes: a receiver receiving the power-feeding control signal; a power feeder performing a power-feeding operation; and a power-feeding control unit controlling the power-feeding operation based on the power-feeding control signal.

9 Claims, 7 Drawing Sheets

VEHICLE CHARGING SYSTEM AND VEHICLE

CROSS-REFERENCE TO RELATED APPLICATION

The present application claims priority from Japanese Patent Application No. 2021-041595 filed on Mar. 15, 2021, the entire contents of which are hereby incorporated by reference.

BACKGROUND

The disclosure relates to a vehicle charging system that controls electric charging to a vehicle in a traveling state, and to a vehicle included in the vehicle charging system.

Some electric vehicles charge their batteries with electric power fed from power-feeding facilities provided in roads, for example, and drive their motors by using the electric power. Reference is made to Japanese Unexamined Patent Application Publication No. 2020-188649.

SUMMARY

An aspect of the technology provides a vehicle charging system including a sensor, a traveling control processor, a traveling drive unit, a transmitter, and a power-feeding facility. The sensor is configured to be disposed on a vehicle configured to travel on a traveling road, and to perform detection of an obstacle present around the vehicle. The traveling control processor is configured to be disposed on the vehicle, and to perform traveling control of the vehicle on the basis of the result of the detection performed by the sensor. The traveling drive unit is configured to be disposed on the vehicle, and includes: a power receiver configured to receive electric power from the traveling road; a battery configured to store the electric power; a motor; and an inverter configured to drive the motor with the electric power, and is configured to drive the vehicle to travel. The transmitter is configured be disposed on the vehicle, and to send a power-feeding control signal that instructs to restrict the electric power fed from the traveling road to the power receiver in a case where the sensor detects the obstacle. The power-feeding facility is configured be disposed on the traveling road, and includes: a receiver configured to receive the power-feeding control signal from the vehicle; a power feeder configured to perform a power-feeding operation to feed the electric power to the power receiver; and a power-feeding control unit configured to control the power-feeding operation of the power feeder on the basis of the power-feeding control signal.

An aspect of the technology provides a vehicle including a sensor, a traveling control processor, a traveling drive unit, and a transmitter. The sensor is configured to perform detection of an obstacle present around the vehicle. The traveling control processor is configured to perform traveling control on the basis of the result of the detection performed by the sensor. The traveling drive unit includes: a power receiver configured to receive electric power from a traveling road; a battery configured to store the electric power; a motor; and an inverter configured to drive the motor with the electric power, and is configured to drive the vehicle to travel. The transmitter is configured to send a power-feeding control signal that instructs to restrict the electric power fed from the traveling road to the power receiver when the sensor detects the obstacle.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
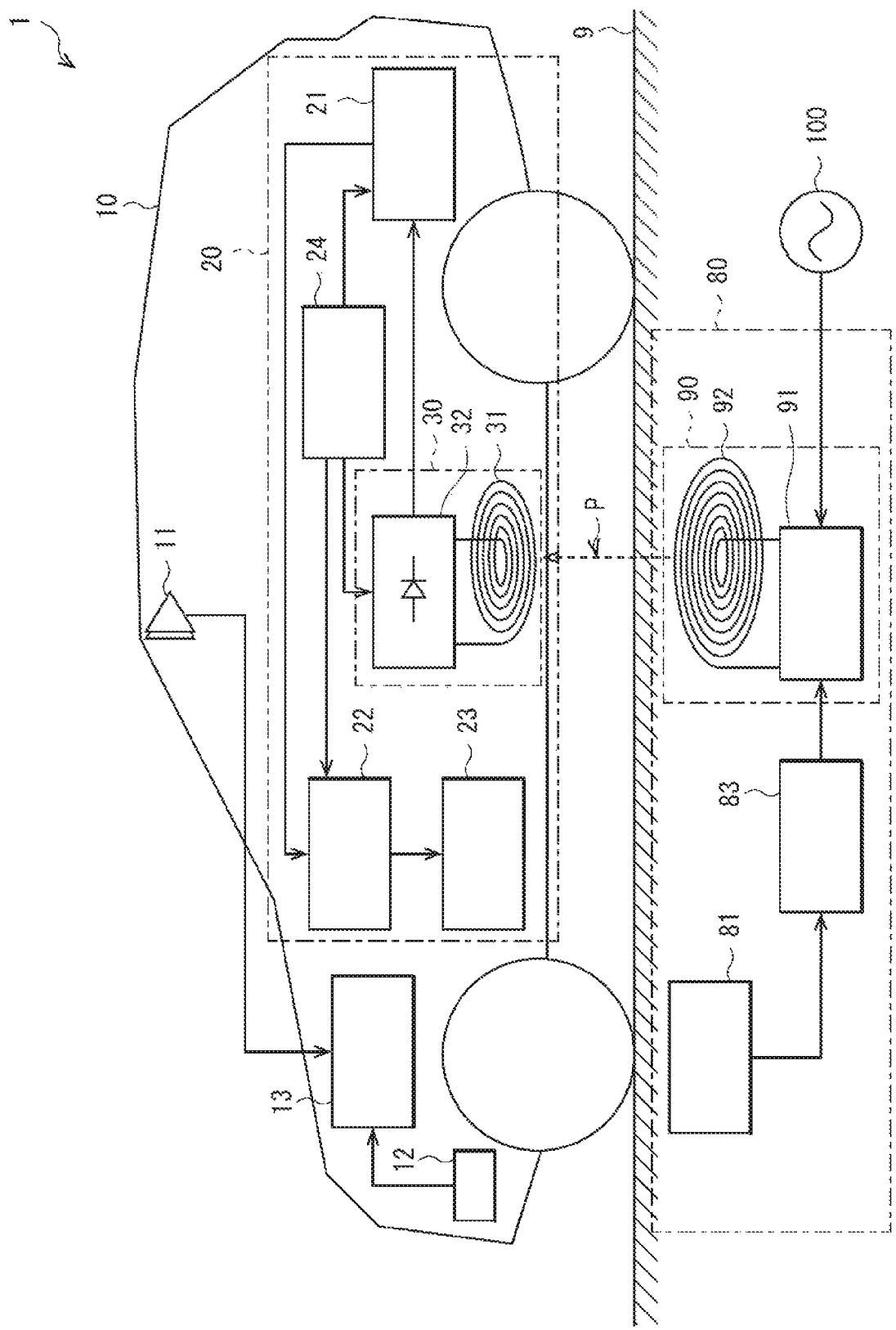
FIG. 1 is an explanatory diagram illustrating an exemplary configuration of a vehicle charging system according to one example embodiment of the technology.

Some vehicles include pre-crash systems that apply the brakes to the vehicles when detecting obstacles with their cameras or sensors to avoid contact with the obstacles. A technique for effectively charging these vehicles with electric power has been desired.

It is desirable to provide a vehicle charging system that effectively charges a vehicle with electric power and a vehicle that is effectively charged with electric power.

In the following, some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the technology are unillustrated in the drawings.

Figure 2:
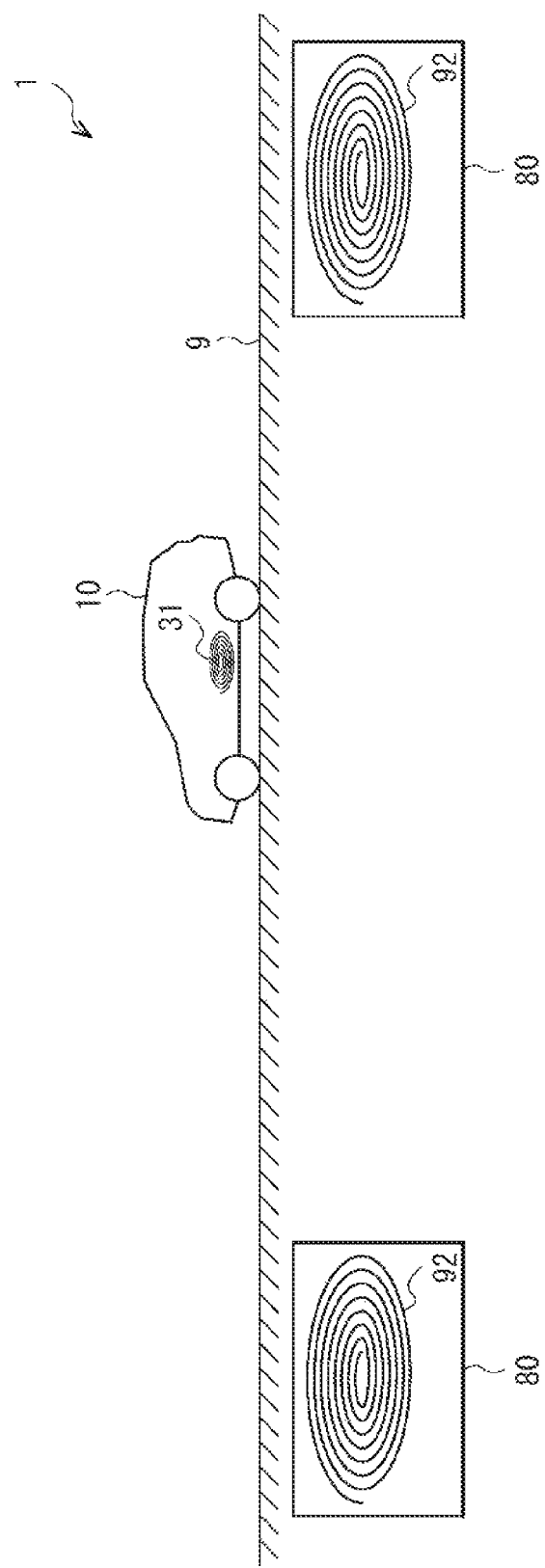
FIG. 2 is an explanatory diagram illustrating an exemplary arrangement of power-feeding facilities illustrated in FIG. 1 in a traveling road.
Figure 3:
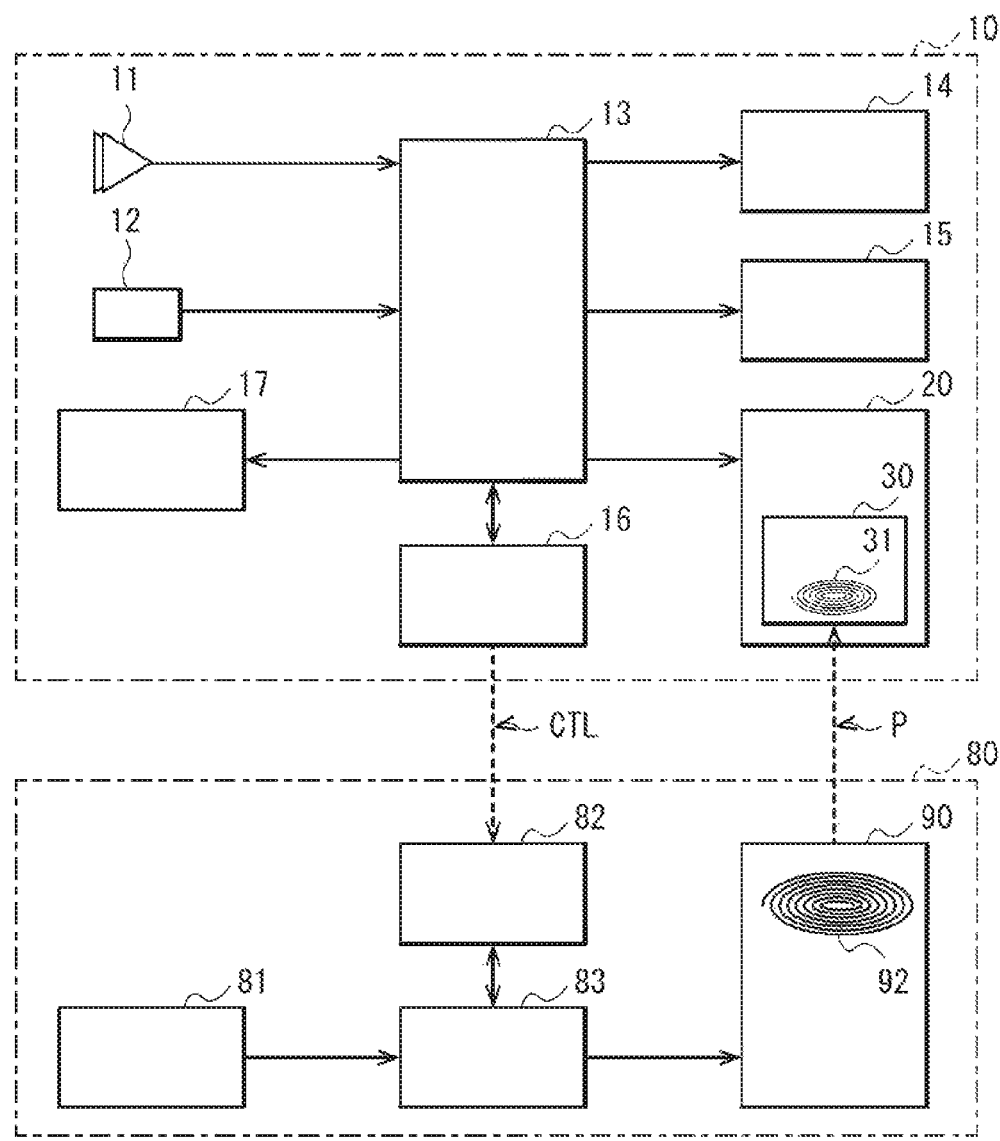
FIG. 3 is a block diagram illustrating an exemplary configuration of the vehicle charging system illustrated in FIG. 1.

FIGS. 1 to 3 illustrate an exemplary configuration of a vehicle charging system 1 according to an example embodiment of the technology. The vehicle charging system 1 may include a vehicle 10 and a plurality of power-feeding facilities 80. The vehicle 10 may be an electric vehicle. The vehicle 10 may travel on a drive road, such as a traveling road 9. The power-feeding facilities 80 may be provided in the traveling road 9. The power-feeding facilities 80 may feed electric power to the vehicle 10 in a contactless manner.

As illustrated in FIG. 2, the power-feeding facilities 80 may be disposed at an interval along the traveling road 9. In the vehicle charging system 1, the vehicle 10 may be sequentially charged with the electric power fed from the power-feeding facilities 80.

As illustrated in FIGS. 1 and 3, the vehicle 10 may include a stereo camera 11, a radar device 12, a traveling control processor 13, a traveling drive unit 20, a brake unit 14, a steering unit 15, and a communicator 16.

The stereo camera 11 illustrated in FIG. 1 may perform imaging of the environment in front of the vehicle 10 to generate a stereo image including a pair of images (e.g., a left image and a right image) having parallaxes. In this example embodiment, the stereo camera 11 may be disposed in the vehicle 10 and at an upper portion of the windshield of the vehicle 10. The stereo camera 11 may include a left camera and a right camera. The left and right cameras may be disposed at a predetermined distance in the width direction of the vehicle 10. The stereo camera 11 may perform imaging at a predetermined frame rate (e.g., 60 [fps]) to generate a series of stereo images. The stereo camera 11 may send the generated stereo image to the traveling control processor 13.

The radar device 12 may detect an object, such as a vehicle, present in the surrounding environment of the vehicle 10 by emitting radio waves, such as millimeter waves, to the surrounding environment of the vehicle 10 and detecting the radio waves reflected from the object. The radar device 12 may send the traveling control processor 13 object position data regarding the relative position of the object with respect to the vehicle 10.

The traveling control processor 13, which is illustrated in FIGS. 1 and 3, controls the vehicle 10. The traveling control processor 13 may include one or more processing units that execute programs, a random access memory (RAM) that temporarily stores processing data, and a read only memory (ROM) that stores programs, for example. The traveling control processor 13 may detect an obstacle having a possibility of contact with the vehicle 10 on the basis of the stereo image received from the stereo camera 11 and the object position data received from the radar device 12, for example. The traveling control processor 13 may control the vehicle 10 to travel avoiding contact with the obstacle. For example, the traveling control processor 13 may avoid contact with the obstacle by causing the brake unit 14 to apply the brake to the vehicle 10 or by causing the steering unit 15 to change the traveling direction of the vehicle 10. Such a system that detects an obstacle and controls traveling of the vehicle 10 to avoid contact with the obstacle may be also referred to as a pre-crash system.

The traveling drive unit 20, which is illustrated in FIGS. 1 and 3, drives the vehicle 10 to travel. As illustrated in FIG. 1, the traveling drive unit 20 may include a power receiver 30, a battery 21, and inverter 22, a motor 23, and a power controller 24.

The power receiver 30 may receive electric power P from the power-feeding facilities 80 in a contactless manner. The power receiver 30 may include a power-receiving coil 31 and a rectifying circuit 32. The power-receiving coil 31 may generate an AC power signal through electromagnetic induction based on the electromagnetic field generated by a power-feeding coil 92 (described below) of the power-feeding facility 80. The power-feeding coil 92 may be buried in the traveling road 9. The rectifying circuit 32 may perform a rectifying operation in response to the AC power signal generated by the power-receiving coil 31. The rectifying circuit 32 may feed the electric power generated by the rectifying operation to the battery 21 in accordance with an instruction from the power controller 24. As described above, the vehicle charging system 1 may cause the power-feeding facilities 80 to feed the electric power P to the vehicle 10, and the battery 21 may be charged with the electric power P.

The battery 21 may store the electric power received from the power receiver 30 and feed the electric power to the inverter 22 in accordance with an instruction from the power controller 24.

The inverter 22 may convert the DC power received from the battery 21 to AC power, and supply the AC power to the motor 23. The inverter 22 may operate in accordance with an instruction from the power controller 24.

The motor 23 may be a power source that generates drive power or mechanical energy from the AC power received from the inverter 22. Rotating the drive wheels with the drive power may cause the vehicle 10 to travel.

The power controller 24 may drive the vehicle 10 to travel with the motor 23 by controlling operations of the rectifying circuit 32, the battery 21, and the inverter 22.

The brake unit 14, which is illustrated in FIG. 3, may apply the brake to the vehicle 10 so that the vehicle 10 is decelerated or stopped in accordance with a brake operation performed by the driver or an instruction from the traveling control processor 13, for example.

The steering unit 15 may change the traveling direction of the vehicle 10 in accordance with a steering operation performed by the driver or an instruction from the traveling control processor 13.

The communicator 16, which is illustrated in FIG. 3, may establish wireless communication with the power-feeding facility 80. As described below, when the vehicle 10 detects an obstacle while the power-feeding facility 80 is feeding the electric power P to the vehicle 10, for example, the communicator 16 may send the power-feeding facility 80 a power-feeding control signal CTL that instructs to stop the power feeding operation. In this example embodiment, the power feeding operation may be stopped when the vehicle 10 detects an obstacle. However, this example is non-limiting. In another example embodiment, when the vehicle 10 detects an obstacle, the amount of electric power fed to the vehicle 10 may be reduced rather than stopping the power feeding operation.

As illustrated in FIG. 3, the vehicle 10 may further include a notification device 17 that notifies the driver of information. For example, the notification device 17 may include a display, such as a liquid crystal display. In this case, the notification device may indicate information on the display to notify the driver of the information. The notification device 17 may further include a speaker, for example. In such a case, the notification device 17 may generate a sound through the speaker to notify the driver of information.

As illustrated in FIGS. 1 and 3, the power-feeding facility 80 may include a vehicle detector 81, a communicator 82, a power feeder 90, and a power-feeding control unit 83.

The vehicle detector 81 may detect whether the vehicle 10 is present within a range in which the power-feeding facility 80 is able to feed electric power to the vehicle 10 (hereinafter referred to as a power-feeding allowable range). For example, the vehicle detector 81 may be buried in the traveling road 9 and detect the vehicle 10 by weight measuring. Alternatively, the vehicle detector 81 may be provided on the traveling road 9. In such a case, the vehicle detector 81 may detect the vehicle 10 by imaging the surroundings of the power-feeding facility 80.

The communicator 82, which is illustrated in FIG. 3, may establish wireless communication with the communicator 16 of the vehicle 10. The communicator 82 may receive the power-feeding control signal CTL from the communicator 16 of the vehicle 10.

The power feeder 90, which is illustrated in FIGS. 1 and 3, may perform the power-feeding operation to feed electric power to the vehicle 10 in a contactless manner in accordance with an instruction from the power-feeding control unit 83. As illustrated in FIG. 1, the power feeder 90 may include a power source 91 and a power-feeding coil 92. The power source 91 may operate in accordance with an instruction from the power-feeding control unit 83, and drive the power-feeding coil 92 with the AC power received from a system power supply 100. The power-feeding coil 92 may be buried in the traveling road 9. The power-feeding coil 92 may be driven by the power source 91 to generate an electromagnetic field. The power-receiving coil 31 in the vehicle 10 may generate an AC power signal through electromagnetic induction based on the electromagnetic field. As described above, the vehicle 10 may be charged with the electric power fed from the power-feeding facility 80.

The power-feeding control unit 83, which is illustrated in FIGS. 1 and 3, may control the operation of the power-feeding facility 80. For example, the power-feeding control unit 83 may control the operation of the power feeder 90 on the basis of the results of the detection performed by the vehicle detector 81 so that the power feeder 90 performs the power-feeding operation when the vehicle 10 is within the power-feeding allowable range of the power-feeding facility 80. When the communicator 82 receives the power-feeding control signal CTL that instructs to stop the power-feeding operation, the power-feeding control unit 83 may stop the power-feeding operation in accordance with the power-feeding control signal CTL.

In one embodiment, the vehicle 10 may serve as a "vehicle". In one embodiment, the stereo camera 11 and the radar device 12 may serve as a "sensor". In one embodiment, the traveling control processor 13 may serve as a "traveling control processor". In one embodiment, the traveling drive unit 20 may serve as a "traveling drive unit". In one embodiment, the power receiver 30 may serve as a "power receiver". In one embodiment, the battery 21 may serve as a "battery". In one embodiment, the inverter 22 may serve as an "inverter". In one embodiment, the motor 23 may serve as a "motor". In one embodiment, the communicator 16 may serve as a "transmitter". In one embodiment, the power-feeding facility 80 may serve as a "power-feeding facility". In one embodiment, the communicator 82 may serve as a "receiver". In one embodiment, the power-feeding control signal CTL may serve as a "power-feeding control signal". In one embodiment, the power feeder 90 may serve as a "power feeder". In one embodiment, the power-feeding control unit 83 may serve as a "power-feeding control unit".

Exemplary operations and effects of the vehicle charging system 1 according to the example embodiment of the technology will now be described.

First, the outline of an exemplary overall operation of the vehicle charging system 1 will now be described with reference to FIG. 1. The vehicle detector 81 in the power-feeding facility 80 may determine whether the vehicle 10 is present within the power-feeding allowable range of the power-feeding facility 80. In a case where the result of the determination by the vehicle detector 81 indicates that the vehicle 10 is present within the power-feeding allowable range of the power-feeding facility 80, the power-feeding control unit 83 may cause the power feeder 90 to perform the power-feeding operation. The power feeder 90, which is illustrated in FIGS. 1 and 3, may feed the electric power P to the vehicle 10 in a contactless manner in accordance with an instruction from the power-feeding control unit 83.

The power receiver 30 of the traveling drive unit 20 in the vehicle 10 may receive the electric power P from the power-feeding facility 80 in the contactless manner. The battery 21 may store the electric power received from the power receiver 30 and supply the electric power to the inverter 22 in accordance with an instruction from the power controller 24. The inverter 22 may convert the DC power received from the battery 21 to AC power, and supply the AC power to the motor 23. The motor 23 may generate drive power or mechanical energy from the AC power received from the inverter 22. The power controller 24 may drive the vehicle 10 to travel with the motor 3 by controlling operations of the rectifying circuit 32, the battery 21, and the inverter 22.

The stereo camera 11 in the vehicle 10 may perform imaging of the environment in front of the vehicle 10 to generate a stereo image including a pair of images (e.g., a left image and a right image) having parallaxes. The radar device 12 may detect an object, such as a vehicle, present in the surrounding environment of the vehicle 10 by emitting radio waves, such as millimeter waves, to the surrounding environment of the vehicle 10 and detecting the radio waves reflected from the object. The traveling control processor 13 may detect an obstacle having a possibility of contact with the vehicle 10 on the basis of the stereo image received from the stereo camera 11 and the object position data received from the radar device 12, for example. The traveling control processor 13 may control the vehicle 10 to travel avoiding contact with the obstacle. For example, the brake unit 14 may apply the brake to the vehicle 10 so that the vehicle 10 is decelerated or stopped in accordance with an instruction from the traveling control processor 13. The steering unit 15 may change the traveling direction of the vehicle 10 in accordance with a steering operation performed by the driver or an instruction from the traveling control processor 13. When the vehicle 10 detects an obstacle while the power-feeding facility 80 is feeding electric power to the vehicle, for example, the communicator 16 may send the power-feeding facility 80 the power-feeding control signal CTL that instructs to stop the power feeding operation. The notification device 17 may notify the driver of information.

The communicator 82 in the power-feeding facility 80 may receive the power-feeding control signal CTL from the communicator 16 in the vehicle 10, for example. When the communicator 82 receives the power-feeding control signal CTL that instructs to stop the power-feeding operation, the power-feeding control unit 83 may stop the power-feeding operation of the power feeder 90 in accordance with the power-feeding control signal CTL.

Figure 4A:
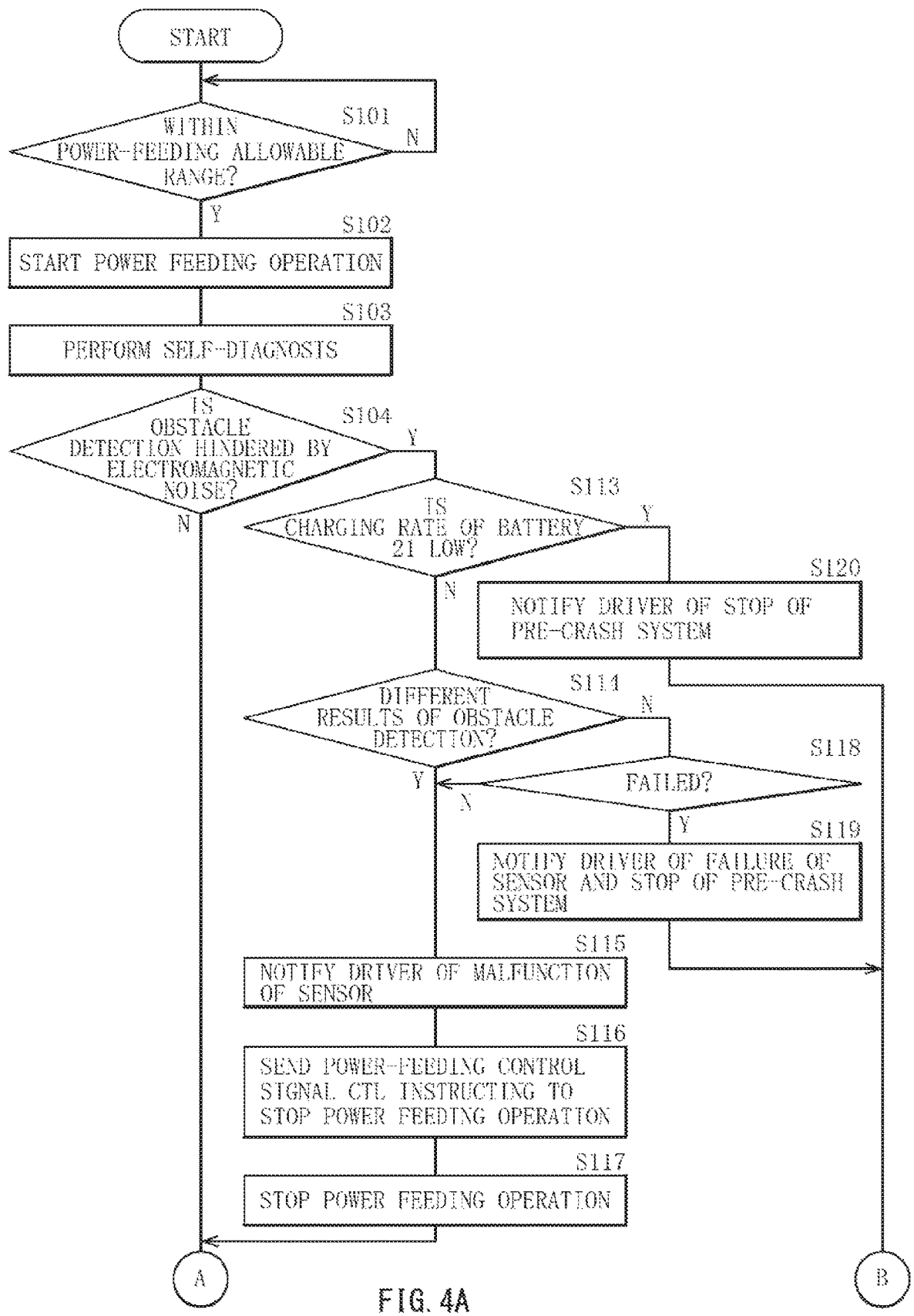
FIG. 4A is a flowchart illustrating an exemplary operation of the vehicle charging system illustrated in FIG. 1.
Figure 4B:
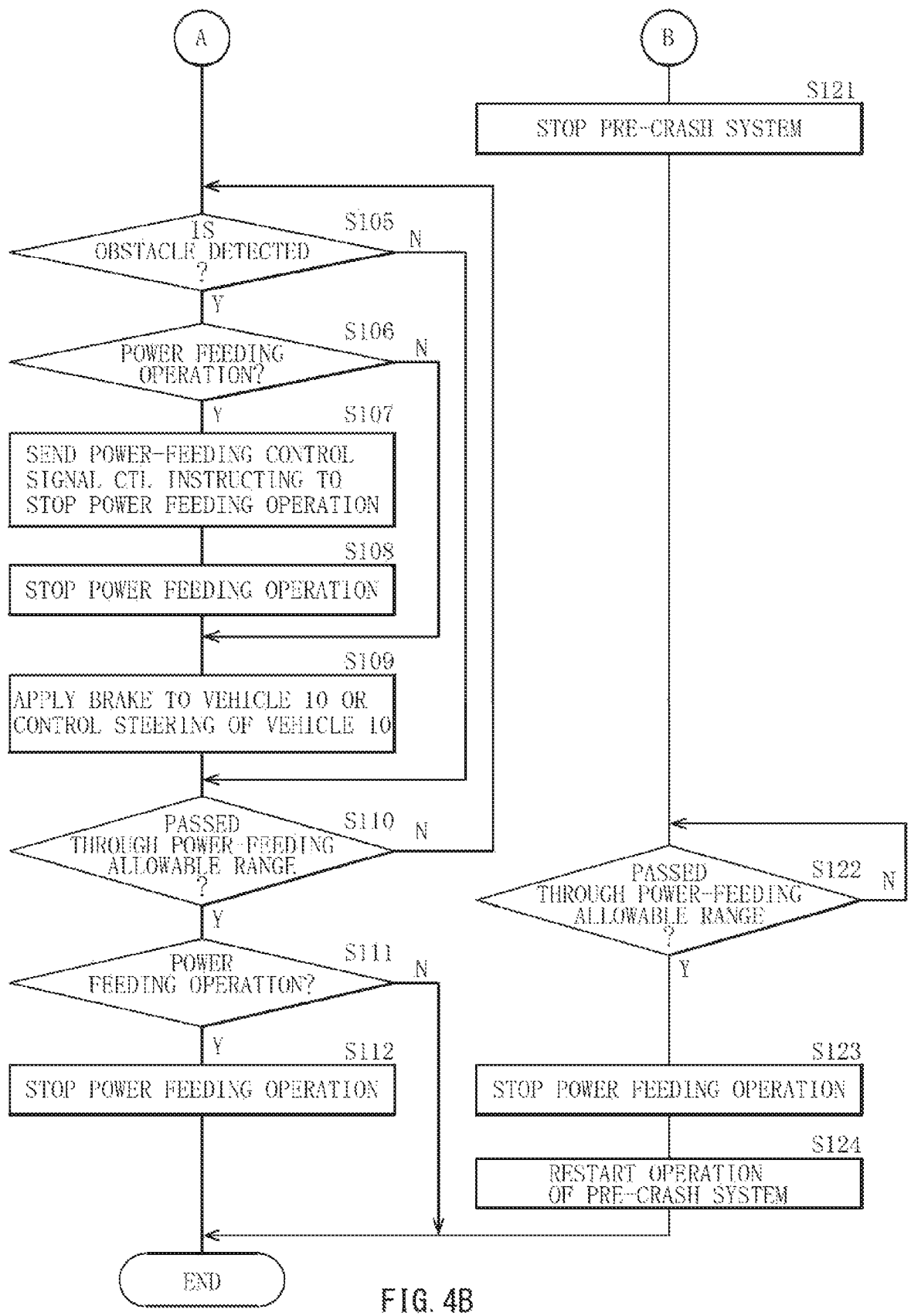
FIG. 4B is a flowchart illustrating an exemplary operation of the vehicle charging system illustrated in FIG. 1.

FIGS. 4A and 4B each illustrate an exemplary operation of the vehicle charging system 1. The vehicle charging system 1 may cause the power-feeding facility 80 to feed electric power to the vehicle 10 every time the vehicle 10 enters the power-feeding allowable range of the power-feeding facility 80. The vehicle charging system 1 may stop the power feeding operation and active the pre-crash system or deactivate the pre-crash system and start the power feeding operation depending on situations. In the following, the series of operations is described in detail.

First, the vehicle detector 81 of the power-feeding facility 80 may determine whether the vehicle is present within the power-feeding allowable range of the power-feeding facility 80 (Step S101). If the vehicle 10 is not present within the power-feeding allowable range (Step S101: N), the vehicle detector 81 may repeat Step S101 until the vehicle 10 enters the power-feeding allowable range of the power-feeding facility 80.

In contrast, if the vehicle 10 is present within the power-feeding allowable range of the power-feeding facility 80 (Step S101: Y), the power-feeding facility 80 may start the power-feeding operation (Step S102). For example, the power source 91 in the power-feeding facility 80 may operate in accordance with an instruction form the power-feeding control unit 83 so as to drive the power-feeding coil 92 with the AC power received from the system power supply 100. The power-feeding coil 92 may generate an electromagnetic field while being driven by the power source 91. The power-receiving coil 31 in the vehicle 10 may generate an AC power signal through electromagnetic induction based on the electromagnetic field. The rectifying circuit 32 may perform a rectifying operation on the basis of the AC power signal generated by the power-receiving coil 31 and feed the electric power generated through the rectifying operation to the battery 21. As described above, the vehicle charging system 1 may feed the electric power P from the power-feeding facility 80 to the vehicle 10 so as to charge the battery 21 with the electric power P.

Thereafter, in Step S103, the traveling control processor 13 in the vehicle 10 may perform a self-diagnosis. In the self-diagnosis, the traveling control processor 13 may determine whether the detection of an obstacle is hindered by an electromagnetic noise generated while the power-feeding facility 80 is feeding the electric power P to the vehicle 10 (Step S104). For example, the traveling control processor 13 may detect an obstacle having a possibility of contact with the vehicle 10 on the basis of the stereo image received from the stereo camera 11 and the object position data received from the radar device 12. In some cases, an electromagnetic noise can be generated by the operation of the power feeder 90 in the power-feeding facility 80 or the operations of the power receiver 30 and the power controller 24 in the vehicle 10. In particular, contactless power feeding, which involves high-voltage signals, can generate a large electromagnetic noise. The radar device 12 can be hindered from detecting an obstacle when the electromagnetic noise interferes with the radio wave for the obstacle detection. Additionally, the digital circuitry in the stereo camera 11 performing predetermined image processing on the stereo image can be affected by the electromagnetic noise. Such an electromagnetic noise can hinder the traveling control processor 13 from detecting an obstacle on the basis of the stereo image received from the stereo camera 11 and the object position data received from the radar device 12. Thus, the traveling control processor 13 may perform the self-diagnosis to determine whether the obstacle detection is hindered.

If the obstacle detection is enabled even during the power feeding (Step S104: N), the power-feeding facility 80 in the vehicle charging system 1 may keep feeding the electric power P to the vehicle 10. Thereafter, the pre-crash system may be activated, as described below.

The traveling control processor 13 in the vehicle 10 may determine whether an obstacle is detected (Step S105). If no obstacle is detected (Step S105: N), the process may proceed to Step S110.

If an obstacle is detected (Step S105: Y), the traveling control processor 13 may determine whether the power-feeding facility 80 is performing the power-feeding operation (Step S106). For example, the traveling control processor 13 may determine whether the power-feeding facility 80 is performing the power-feeding operation by determining whether the power receiver 30 is receiving the electric power P. If the power-feeding facility 80 is not performing the power-feeding operation (Step S106: N), the process may proceed to Step S109.

In contrast, if the power-feeding facility 80 is performing the power-feeding operation (Step S106: Y), the vehicle 10 may send the power-feeding facility 80 the power-feeding control signal CTL that instructs to stop the power-feeding operation (Step S107). For example, the traveling control processor 13 may determine to stop the power-feeding operation when determining that the power-feeding facility 80 is performing the power-feeding operation because the traveling control processor 13 can falsely detect an obstacle due to an electromagnetic noise. Thereafter, the communicator 16 may send the power-feeding facility 80 the power-feeding control signal CTL that instructs to stop the power-feeding operation in accordance with an instruction from the traveling control processor 13.

In accordance with the power-feeding control signal CTL, the power-feeding facility 80 may stop the power-feeding operation (Step S108). For example, the communicator 82 in the power-feeding facility 80 may receive the power-feeding control signal CTL from the vehicle 10. On the basis of the power-feeding control signal CTL, the power-feeding control unit 83 may control the operation of the power feeder 90. The power feeder 90 may stop the power-feeding operation in accordance with an instruction form the power-feeding control unit 83. In this way, the vehicle charging system 1 may stop feeding electric power to the vehicle 10 and activate the pre-crash system.

Thereafter, the traveling control processor 13 may apply the brake to the vehicle 10 or perform steering control of the vehicle 10 (Step S109). In other words, after an obstacle is detected by the traveling control processor 13 in Step S105, the traveling control processor 13 may activate the pre-crash system to apply the brake to the vehicle 10 or perform steering control of the vehicle 10 to avoid contact with the obstacle.

Thereafter, the vehicle detector 81 in the power-feeding facility 80 may determine whether the vehicle 10 has passed through the power-feeding allowable range of the power-feeding facility 80 (Step S110). If the vehicle 10 is still within the power-feeding allowable range (Step S110: N), the procedure may return to Step S105. The vehicle charging system 1 may repeat Steps S105 to S110 until the vehicle 10 passes through the power-feeding allowable range.

If the vehicle 10 has exited from the power-feeding allowable range of the power-feeding facility 80 (Step S110: Y), the power-feeding control unit 83 in the power-feeding facility 80 may determine whether the power feeder 90 is performing the power-feeding operation (Step S111). If the power feeder 90 has already finished the power-feeding operation (Step S111: N), the process may be end. In contrast, if the power feeder 90 is still performing the power-feeding operation (Step S111: Y), the power-feeding control unit 83 may control the operation of the power feeder 90. The power feeder 90 stops the power-feeding operation in accordance with an instruction from the power-feeding control unit 83 (Step S112). Thereafter, the process may end.

If the traveling control processor 13 is hindered from detecting an obstacle by an electromagnetic noise (Step S104: Y), the traveling control processor 13 may determine in Step S113 whether the charging rate of the battery 21 is low. For example, the traveling control processor 13 may determine whether the charging rate of the battery 21 is low by comparing the charging rate of the battery 21 with a predetermined value. The predetermined value may be set to such a charging rate that keeps the battery 21 charged with electric power.

If the traveling control processor 13 may determine in Step S113 that the charging rate of the battery 21 is not low (Step S113: N), the traveling control processor 13 may determine in Step S114 whether the result of obstacle detection based on the stereo image supplied from the stereo camera 11 differs from the result of obstacle detection based on the object position data supplied from the radar device 12. The traveling control processor 13 may detect obstacles present in front of the vehicle 10 on the basis of the image of the front environment of the vehicle 10 captured by the stereo camera 11. Additionally, the traveling control processor 13 may detect obstacles present in front of, on the side of, and behind the vehicle 10 with the radar device 12 emitting radio waves to the surrounding environment of the vehicle 10 in order to detect a vehicle or other obstacles present in the surrounding environment of the vehicle 10. Thus, the traveling control processor 13 may compare the result of obstacle detection in the front environment of the vehicle 10 based on the stereo image supplied from the stereo camera 11 with the result of obstacle detection in the front environment of the vehicle 10 based on the object position data supplied from the radar device 12. These results of detection may be expected to be identical to each other. However, these results of detection may differ from each other in some cases due to an electromagnetic noise.

If the result of obstacle detection based on the stereo image supplied from the stereo camera 11 differs from the result of obstacle detection based on the obstacle position data supplied from the radar device 12 (Step S114: Y), the vehicle 10 may notify the driver of the malfunction of the sensor (e.g., the stereo camera 11 or the radar device 12) in Step S115. For example, the traveling control processor 13 may determine that either the result of obstacle detection based on the stereo image supplied from the stereo camera 11 or the result of obstacle detection based on the obstacle position data supplied from the radar device 12 differs from a desired result under the influence of an electromagnetic noise. In other words, the traveling control processor 13 may determine that either the stereo camera 11 or the radar device 12 is malfunctioning due to an electromagnetic noise. The notification device 17 may notify the driver of the malfunction of the sensor in accordance with an instruction from the traveling control processor 13.

Thereafter, the vehicle 10 may send the power-feeding facility 80 the power-feeding control signal CTL that instructs to stop the power feeding operation (Step S116). For example, when the sensor is malfunctioning due to the electromagnetic noise, the traveling control processor 13 may determine to stop the power feeding operation so that the electromagnetic noise will not be generated. Thereafter, the communicator 16 may send the power-feeding facility 80 the power-feeding control signal CTL that instructs to stop the power-feeding operation in accordance with an instruction from the traveling control processor 13.

On the basis of the power-feeding control signal CTL, the power-feeding facility 80 may stop the power feeding operation (Step S117). For example, the communicator 82 of the power-feeding facility 80 may receive the power-feeding control signal CTL from the vehicle 10. The power-feeding control unit 83 may control the operation of the power feeder 90 on the basis of the power-feeding control signal CTL. The power feeder 90 may stop the power-feeding operation in accordance with an instruction from the power-feeding control unit 83. Thereafter, the process proceed to Step S105. That is, the power-feeding facility 80 may be supplying the electric power P to the vehicle 10 when the process proceeds from Step S104 to Step S105; whereas, the power-feeding facility 80 may not be supplying the electric power P to the vehicle 10 when the process proceeds from Step S117 to Step S105. Thereafter, the vehicle charging system 1 may perform Steps S105 to S112.

If the result of obstacle detection based on the stereo image supplied from the stereo camera 11 is identical to the result of obstacle detection based on the object position data supplied from the radar device 12 (Step S114: N), the traveling control processor 13 may determine in Step S118 whether the sensor (e.g., the stereo camera 11 or the radar device 12) has failed through the self-diagnosis described in Step S103. If the sensor has not failed (Step S118: N), the process may proceed to Step S115. That is, in a case where the traveling control processor 13 is hindered from detecting an obstacle by the electromagnetic noise (Step S104: Y), and where the sensor has not failed (Step S118: N), the traveling control processor 13 may determine that both the result of obstacle detection based on the stereo image supplied from the stereo camera 11 and the result of obstacle detection based on the object position data supplied from the radar device 12 falsely indicate that no obstacle has been detected under the influence of the electromagnetic noise despite the fact that an obstacle is actually present. In other words, the traveling control processor 13 may determine that both the stereo camera 11 and the radar device 12 are malfunctioning due to the electromagnetic noise. In such a case, the process may proceed from Step S118 to Step S115. In Step S115, the vehicle 10 may notify the driver of the malfunction of the sensor. Thereafter, in Step S116, the vehicle 10 may send the power-feeding facility 80 the power-feeding control signal CTL that instructs to stop the power feeding operation. In Step S117, the power-feeding facility 80 may stop the power-feeding operation in accordance with the power-feeding control signal CTL.

If the sensor (e.g., the stereo camera 11 or the radar device 12) has failed (Step S118: Y), the vehicle 10 may notify to the driver that the sensor has failed and the pre-crash system will be stopped (Step S119). For example, in a case were the sensor has failed, the traveling control processor 13 may determine to stop the pre-crash system because an obstacle will not be detected appropriately even after the pre-crash system is operated. Thereafter, the notification device 17 may notify to the driver that the sensor has failed and the pre-crash system will be stopped. The process may then proceed to Step S121.

If the charging rate of the battery 21 is low (Step S113: Y), the vehicle 10 may notify to the driver that the pre-crash system will be stopped (Step S120). For example, the traveling control processor 13 may determine that charging of the battery 21 should be performed preferentially over the processing of the pre-crash system because of the low charging rate, and determine to stop the pre-crash system. Thereafter, the notification device 17 may notify to the driver that the pre-crash system will be stopped. The process may then proceed to Step S121.

In Step S121, the traveling control processor 13 may stop the pre-crash system (Step S121). As described above, the vehicle charging system 1 may stop the pre-crash system and perform the power feeding operation.

In Step S122, the vehicle detector 81 in the power-feeding facility 80 may determine whether the vehicle 10 has been passed through the power-feeding allowable range of the power-feeding facility 80. If the vehicle 10 is still within the power-feeding allowable range (Step S122: N), the process may return to Step S122. The vehicle charging system 1 may repeat Step S122 until the vehicle 10 exits from the power-feeding allowable range.

When the vehicle 10 has exited from the power-feeding allowable range of the power-feeding facility 80 (Step S122: Y), the power-feeding control unit 83 may control the operation of the power feeder 90. The power feeder 90 may stop the power feeding operation in accordance with an instruction from the power-feeding control unit 83 (Step S123).

Thereafter, in Step S124, the vehicle 10 may restart the pre-crash system having been stopped in Step S121. The process may then end.

In this example embodiment, the vehicle 10 may send the power-feeding control signal CTL to the power-feeding facility 80 when the vehicle 10 is within the power-feeding allowable range of the power-feeding facility 80. However, this example is non-limiting. Alternatively, the vehicle 10 may send the power-feeding control signal CTL to the power-feeding facility 80 also when the vehicle 10 is out of the power-feeding allowable range, for example. For instance, the vehicle 10 may send the power-feeding control signals CTL to two power-feeding facilities 80 after passing through the power-feeding allowable range of one of the power-feeding facilities 80 and before reaching the power-feeding allowable range of the other power-feeding facility 80. In this example, even if the vehicle 10 within the power-feeding allowable range of the power-feeding facility 80 is hindered from sending the power-feeding control signal CTL by an electromagnetic noise, the vehicle 10 makes it possible to send the power-feeding control signal CTL while being in an area between the two power-feeding facilities 80 where no electromagnetic noise is generated.

Still alternatively, the power-feeding facilities 80 may communicate with each other to exchange various information items, for example. In this case, the power-feeding control signal CTL sent by the vehicle 10 may include traveling information regarding the vehicle 10, for example. The power-feeding control signal CTL may include, for example, information on the traveling speed of the vehicle 10 and information on the traveling lane on which the vehicle 10 is traveling.

Figure 5:
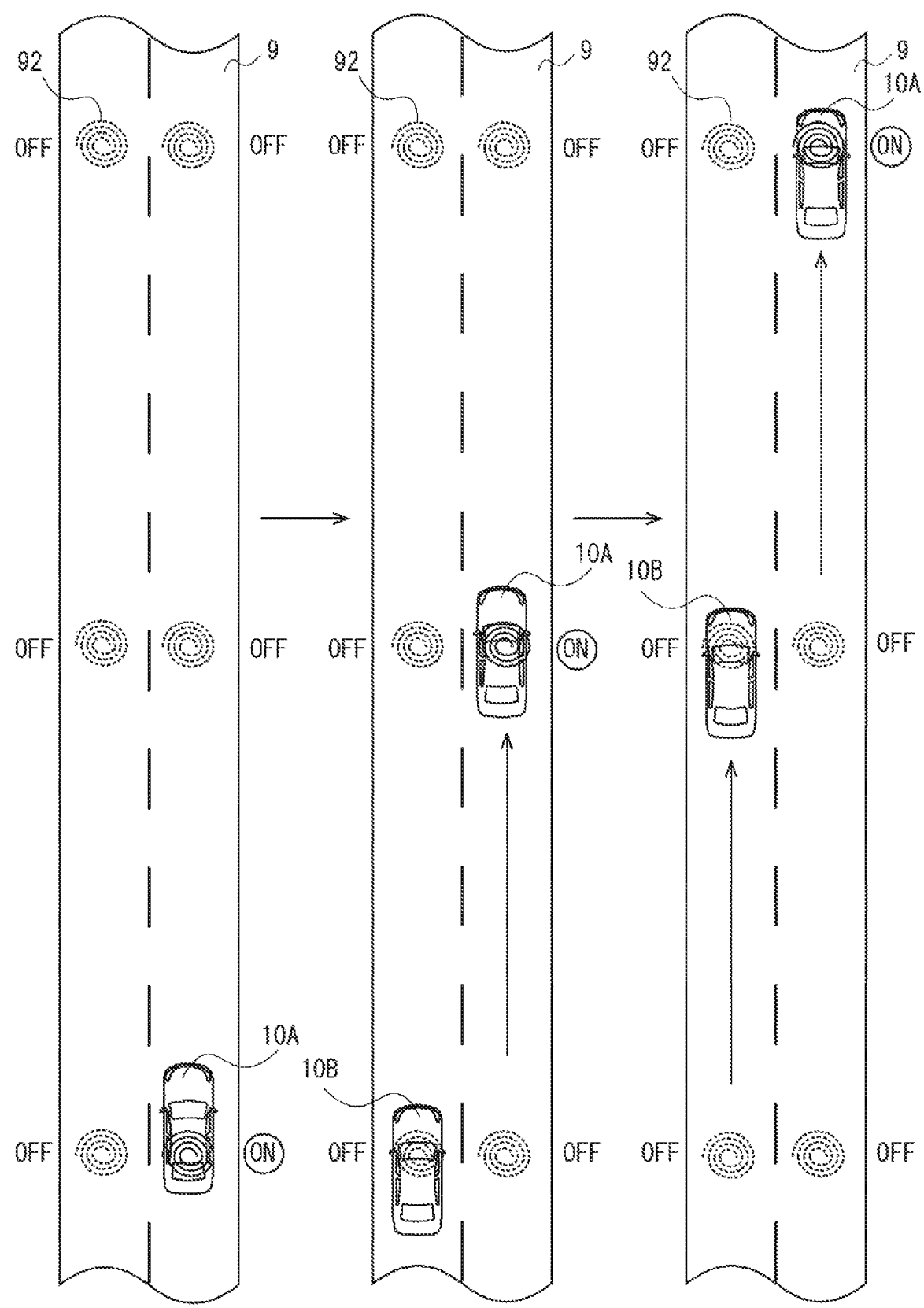
FIG. 5 is an explanatory diagram illustrating an exemplary operation of the vehicle charging system illustrated in FIG. 1.

FIG. 5 illustrates an exemplary operation of the vehicle charging system 1 for sending the information on the traveling speed of the vehicle 10 and the information on the traveling lane on which the vehicle 10 is traveling. In this example, vehicles 10A and 10B are traveling on the traveling road 9 having two traveling lanes. In FIG. 5, the power-feeding coil 92 of the power-feeding facility 80 performing the power feeding operation is illustrated by a solid line, while the power-feeding coil 92 of the power-feeding facility 80 not performing the power feeding operation is illustrated by a broken line.

In this example, the vehicle 10A is traveling on the right lane of the traveling road 9. The obstacle detection performed by the vehicle 10A is not affected by the electromagnetic noise generated during the power feeding. Accordingly, the power-feeding facilities 80 may estimate positions of the vehicle 10A on the basis of the information on the traveling speed of the vehicle 10A and the information on the traveling lane on which the vehicle 10A is traveling, and sequentially perform the power-feeding operations to feed electric power to the vehicle 10A on the basis of the estimated positions of the vehicle 10A.

In contrast, the vehicle 10B is traveling on the left lane of the traveling road 9. The obstacle detection performed by the vehicle 10B is affected by an electromagnetic noise generated during the power feeding. Accordingly, the power-feeding facilities 80 may estimate positions of the vehicle 10B on the basis of the information on the traveling speed of the vehicle 10B and the information on the traveling lane on which the vehicle 10B is traveling, and refrain from performing the power feeding operation so as not to feed electric power to the vehicle 10B.

Figure 6:
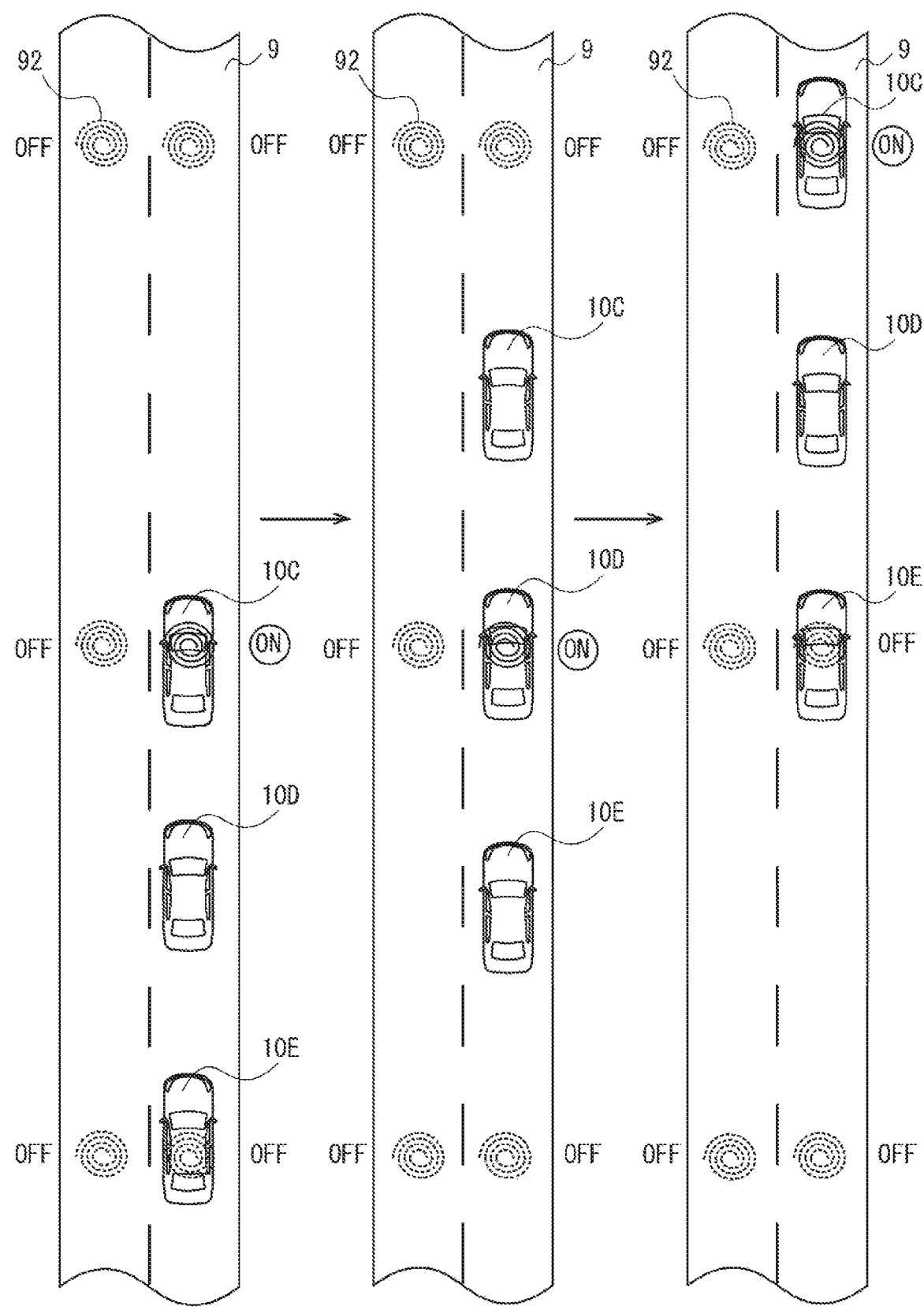
FIG. 6 is an explanatory diagram illustrating another exemplary operation of the vehicle charging system illustrated in FIG. 1.

FIG. 6 illustrates another exemplary operation of the vehicle charging system 1 for sending the information on the traveling speed of the vehicle 10 and the information on the traveling lane on which the vehicle 10 is traveling. In this example, vehicles 10C, 10D, and 10E are traveling on the right lane of the traveling road 9.

In this example, the obstacle detection performed by the vehicles 10C and 10D is not affected by the electromagnetic noise generated during the power feeding. Accordingly, the power-feeding facilities 80 may estimate positions of the vehicles 10C and 10D on the basis of the information on the traveling speeds of the vehicles 10C and 10D and the information on the traveling lane on which the vehicles 10C and 10D are traveling, and sequentially perform the power-feeding operations to feed electric power to the vehicles 10C and 10D on the basis of the estimated positions of the vehicles 10C and 10D.

In contrast, the obstacle detection performed by the vehicle 10E is affected by the electromagnetic noise generated during the power feeding. Accordingly, the power-feeding facilities 80 may estimate positions of the vehicle 10E on the basis of the information on the traveling speed of the vehicle 10E and the information on the traveling lane on which the vehicle 10E is traveling, and sequentially stop the power-feeding operations so as not to feed electric power to the vehicle 10E on the basis of the estimated positions of the vehicle 10E.

As described above, the vehicle charging system 1 includes the sensor (e.g., the stereo camera 11 and the radar device 12), the traveling control processor 13, the traveling drive unit 20, and the communicator 16. The sensor detects an obstacle present around the vehicle 10. The traveling control processor 13 performs the traveling control of the vehicle 10 on the basis of the result of detection performed by the sensor. The traveling drive unit 20 includes the power receiver 30 that receives the electric power P from the traveling road 9, the battery 21 that stores the electric power P, the motor 23, and the inverter 22 that drives the motor 23 with the electric power P. The traveling drive unit 20 drives the vehicle 10 to travel. The communicator 16 sends the power-feeding control signal CTL that instructs to restrict the electric power P fed from the traveling road 9 to the power receiver 30 when the sensor detects an obstacle. Accordingly, it is possible to restrict the electric power P fed to the power receiver 30 when the sensor detects an obstacle. For example, the power-feeding operation may be stopped, or the electric power P fed to the power receiver 30 may be reduced without stopping the power feeding operation. This reduces the electromagnetic noise generated in the vehicle charging system 1, lowering the possibility of malfunction of the pre-crash system. In contrast, when the sensor detects no obstacle, the power feeding operation is performed. This allows the vehicle charging system 1 to maintain the reliability of the pre-crash system while feeding electric power to the vehicle 10. Accordingly, it is possible to effectively charge the vehicle 10 with electric power.

Further, as described above, the communicator 16 of the vehicle charging system 1 may send the power-feeding control signal CTL when the sensor is unable to detect an obstacle while the power receiver 30 is receiving the electric power P from the traveling road 9. This restricts the electric power P fed to the power receiver 30 when the sensor is unable to detect an obstacle, suppressing generation of an electromagnetic noise. In contrast, when the sensor is able to detect an obstacle, for example, the feeding operation is performed. This allows the vehicle charging system 1 to maintain the reliability of the pre-crash system while feeding electric power to the vehicle 10. Accordingly, it is possible to effectively charge the vehicle 10 with electric power.

Further, when the charging rate of the battery 21 is low, the traveling control processor 13 of the vehicle charging system 1 may refrain from performing the traveling control of the vehicle 10 on the basis of the result of detection performed by the sensor, and the communicator 16 may refrain from sending the power-feeding control signal CTL. Accordingly, when the charging rate of the battery 21 is low, the pre-crash system is stopped, and the power feeding operation is preferentially performed, for example. Therefore, it is possible to effectively charge the vehicle 10 with electric power.

Further, the power-feeding control signal CTL sent by the vehicle charging system 1 may include the traveling information regarding the vehicle 10, as described above. For example, the power-feeding control signal CTL may include the information on the traveling speed of the vehicle 10 and the information on the traveling lane on which the vehicle 10 is traveling. This allows the power-feeding facilities 80 to perform or stop the power feeding operation on the basis of the positions of the vehicle 10, for example. Accordingly, it is possible to effectively charge the vehicle 10 with electric power.

According to the foregoing example embodiment of the technology, the vehicle charging system includes: the sensor that performs detection of an obstacle present around the vehicle; the traveling control processor that performs the traveling control of the vehicle on the basis of the result of detection performed by the sensor; the traveling drive unit that includes the power receiver that receivers electric power from the traveling road, the battery configured to store the electric power, the motor, and the inverter that drives the motor with the electric power, and drives the vehicle to travel; and the communicator that sends the power-feeding control signal that restricts the electric power fed from the traveling road to the power receiver when the sensor detects an obstacle. Accordingly, it is possible to effectively charge the vehicle with electric power.

According to at least one of the foregoing example embodiments, the communicator may further send the power-feeding control signal when the sensor is unable to detect an obstacle while the power receiver is receiving the electric power from the traveling road. Accordingly, it is possible to effectively charge the vehicle with electric power.

According to at least one of the foregoing example embodiments, when the charging rate of the battery is low, the traveling control processor may refrain from performing the traveling control of the vehicle on the basis of the result of detection performed by the sensor, and the communicator may refrain from sending the power-feeding control signal. Accordingly, it is possible to effectively charge the vehicle with electric power.

According to at least one of the foregoing example embodiments, the power-feeding control signal may further include the traveling information regarding the vehicle. Accordingly, it is possible to effectively charge the vehicle with electric power.

The technology has been described with reference to the foregoing example embodiments. The technology, however, should not be limited to these example embodiments, and various modification may be made.

For example, although the stereo camera 11 and the radar device 12 serve as the sensor in the foregoing example embodiments, this example is non-limiting. Alternatively, in place of the stereo camera 11, a monocular camera may serve as the sensor. Additionally, another device may be used as the sensor.

It should be understood that the effects described herein are mere examples and non-limiting, and other effects may be provided.

The invention claimed is:

1. A vehicle charging system comprising:
a sensor configured to be disposed on a vehicle configured to travel on a traveling road, the sensor being configured to perform detection of an obstacle present around the vehicle;
a traveling control processor configured to be disposed on the vehicle and to perform traveling control of the vehicle on a basis of a result of the detection performed by the sensor;
a traveling drive unit configured be disposed on the vehicle, the traveling drive unit comprising
a power receiver configured to receive electric power from the traveling road,
a battery configured to store the electric power,
a motor, and
an inverter configured to drive the motor with the electric power, the traveling drive unit being configured to drive the vehicle to travel;
a transmitter configured be disposed on the vehicle, the transmitter being configured to send a power-feeding control signal that instructs to restrict the electric power fed from the traveling road to the power receiver in a case where the sensor detects the obstacle; and
a power-feeding facility configured be disposed on the traveling road, the power-feeding facility including
a receiver configured to receive the power-feeding control signal from the vehicle,
a power feeder configured to perform a power-feeding operation to feed the electric power to the power receiver, and
a power-feeding control unit configured to control the power-feeding operation of the power feeder on a basis of the power-feeding control signal.

2. The vehicle charging system according to claim 1, wherein
the transmitter is further configured to send the power-feeding control signal in a case where the sensor is unable to detect an obstacle while the power receiver is receiving the electric power from the traveling road.

3. The vehicle charging system according to claim 2, wherein
the traveling control processor is configured to, in a case where a charging rate of the battery is low, refrain from performing the traveling control of the vehicle on the basis of the result of the detection performed by the sensor, and
the transmitter is configured to, in a case where the charging rate of the battery is low, refrain from sending the power-feeding control signal.

4. The vehicle charging system according to claim 3, wherein the power-feeding control signal further includes traveling information regarding the vehicle.

5. The vehicle charging system according to claim 2, wherein the power-feeding control signal further includes traveling information regarding the vehicle.

6. The vehicle charging system according to claim 1, wherein
- the traveling control processor is configured to, in a case where a charging rate of the battery is low, refrain from performing the traveling control of the vehicle on the basis of the result of the detection performed by the sensor, and
- the transmitter is configured to, in a case where the charging rate of the battery is low, refrain from sending the power-feeding control signal.

7. The vehicle charging system according to claim 6, wherein the power-feeding control signal further includes traveling information regarding the vehicle.

8. The vehicle charging system according to claim 1, wherein the power-feeding control signal further includes traveling information regarding the vehicle.

9. A vehicle comprising:
- a sensor configured to perform detection of an obstacle present around the vehicle;
- a traveling control processor configured to perform traveling control on a basis of a result of the detection performed by the sensor;
- a traveling drive unit including
  - a power receiver configured to receive electric power from a traveling road,
  - a battery configured to store the electric power,
  - a motor, and
  - an inverter configured to drive the motor with the electric power, the traveling drive unit being configured to drive the vehicle to travel; and
- a transmitter configured to send a power-feeding control signal that instructs to restrict the electric power fed from the traveling road to the power receiver when the sensor detects the obstacle.

* * * * *